United States Patent [19]

Flowers

[11] Patent Number: 5,186,479
[45] Date of Patent: Feb. 16, 1993

[54] MULTI-FUNCTION CART

[76] Inventor: Henry C. Flowers, 19032 W. Davison, Detroit, Mich. 48223

[21] Appl. No.: 854,228

[22] Filed: Mar. 20, 1992

[51] Int. Cl.$^5$ .............................................. B62B 3/02
[52] U.S. Cl. ................................ 280/47.35; 206/511; 280/651
[58] Field of Search ...................... 206/505, 509, 511; 280/47.35, 79.11, 79.3, 33.998, 638, 35, 651; 211/128, 194

[56] References Cited

U.S. PATENT DOCUMENTS

| | | | |
|---|---|---|---|
| 2,718,404 | 9/1955 | Burskey | 280/638 |
| 3,372,829 | 3/1968 | Averill | 280/79.3 X |
| 3,984,116 | 10/1976 | Bowers | 280/32.6 |
| 4,015,743 | 4/1977 | Beretta | 206/511 X |
| 4,114,914 | 9/1978 | Cohen | 280/30 |
| 4,458,815 | 7/1984 | Mollman | 206/511 |
| 4,796,909 | 1/1989 | Kirkendall | 280/651 |
| 4,911,303 | 3/1990 | Anderson | 206/511 X |
| 4,998,023 | 3/1991 | Kitts | 280/79.3 X |

Primary Examiner—Margaret A. Focarino
Assistant Examiner—Michael Mar
Attorney, Agent, or Firm—Peter D. Keefe

[57] ABSTRACT

A multi-function cart which is readily adaptable to varying cargo transport conditions and a variety of uses. The multi-function cart is composed generally of a bed, a rail along the periphery of the upper side of the bed, two sets of wheels connected with the underside of the bed, and a width adjustment mechanism that permits a user to select a width of the bed with respect to the left and right sides of the cart. The cart further includes extensible handles and a user installable upper deck which removably interfaces with the upper side of the bed for substantially doubling the cargo bed area, a creeper top for converting the cart into a mechaninc's creeper, and a tray for converting the cart into a wheeled drip pan. Still further, the creeper top is convertible into a portable seat.

4 Claims, 5 Drawing Sheets

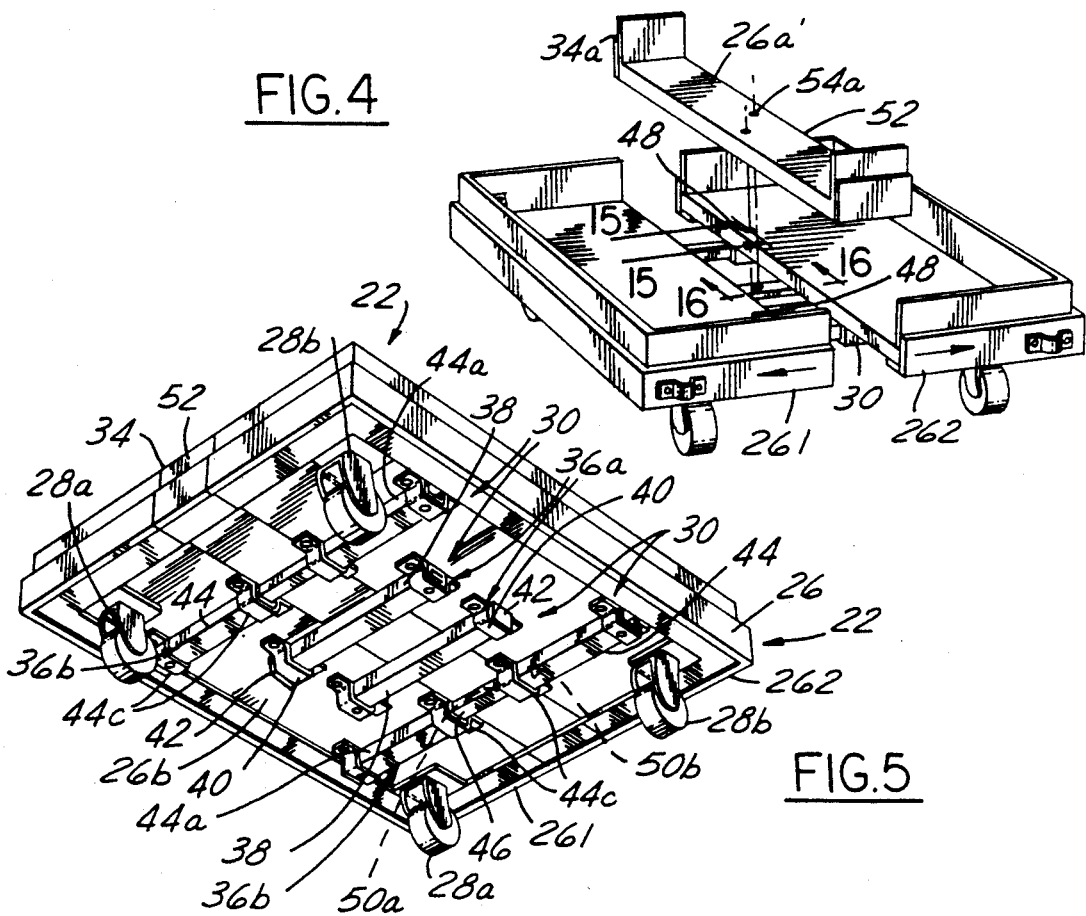
FIG.4
FIG.5
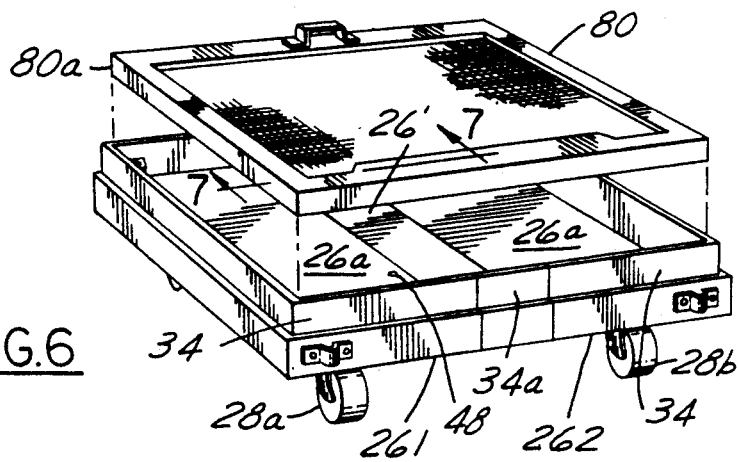
FIG.6
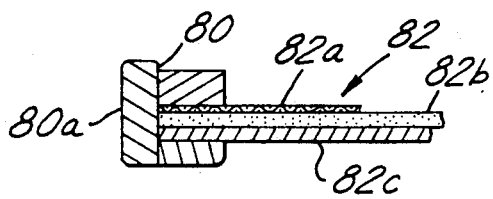
FIG.7

MULTI-FUNCTION CART

BACKGROUND OF THE INVENTION

1. Field of the Invention

The present invention relates to four wheeled carts, and more particularly to a cart having multiple functions, including: being selectively double decked, being variable in width, being convertible into a creeper and being convertible into a wheeled drip pan.

2. Description of the Prior Art

Carts are well known in the prior art for purposes of holding articles for wheeled transport. Typically, a cart (or wagon and the like) is composed of a flat bed for supporting the articles, a railing around the perimeter of the bed for retaining the articles upon the bed, a set of four wheels connected with the bottom side of the bed, and a handle with which to pull and steer the cart.

While carts are useful as they are conventionally configured, they do not afford convertibility to other functional situations, such as conversion from an articles conveyance device to an automobile mechanic's creeper, nor do they afford adaptability to changing use conditions, such as being able to selectively adjust the usable bed area to suit varying cargoes.

An example of a prior art cart having some degree of adaptability is described in U.S. Pat. No. 4,796,909, to Kirkendall, dated Jan. 10, 1989. In this cart, the bed is selectively expansible between the front and rear wheels in order to accommodate differing cargoes.

Another example of a prior art cart having some degree of adaptability is described in U.S. Pat. No. 2,718,404 to Burskey, dated Sep. 20, 1955. In this cart, which is composed of a frame-like structure, is longitudinally expansible between the front and rear wheels also to accommodate differing cargoes.

These prior art carts suffer from the fact that they are extensible only from front to back, thereby increasing the length when in the extended configuration. What would have been better would be to increase the width, as this affords a more compact over-all size of the cart when the cart is in an extended configuration.

An example of a mechanic's creeper is described in U.S. Pat. No. 3,984,116 to Bowers, dated Oct. 5, 1976. In this creeper, two outer panels fold about a middle panel which permits the creeper to be easily and compactly stored for emergency use in connection with a vehicle.

Accordingly, what is needed is a cart which is truly adaptable to many differing conditions of use, thereby providing an extremely high level of utility for the user.

SUMMARY OF THE INVENTION

The present invention is a multi-function cart which is readily adaptable to varying cargo transport conditions and a variety of uses.

The multi-function cart according to the present invention is composed generally of a bed, a rail along the periphery of the upper side of the bed, two sets of wheels connected with the underside of the bed, and a width adjustment mechanism that permits a user to select a width of the bed with respect to the left and right sides of the cart. The cart further includes extensible handles and a user installable upper deck which removably interfaces with the upper side of the bed for substantially doubling the cargo bed area, a creeper top for converting the cart into a mechanic's creeper, and a tray for converting the cart into a wheeled drip pan. Still further, the creeper top is convertible into a portable seat.

Accordingly, it is an object of the present invention to provide a cart which has ability to provide multiple functions and be adaptable to differing cargo transport conditions.

It is yet an additional object of the present invention to provide a cart which can provide for selectively doubling the bed area.

It is yet an additional object of the present invention to provide a cart having a user selectable bed width for adapting the bed of the cart to particular cargo carrying situations.

It is another object of the present invention to provide a cart having provision for user selectable addition of an upper deck.

It is yet another object of the present invention to provide a cart which is selectively convertible into a mechanic's creeper.

It is an additional object of the present invention to provide a cart which is selectively convertible into a mechanic's creeper, in which the creeper top is itself convertible into a portable seat.

It is still another object of the present invention to provide a cart which is selectively convertible into a drip pan for being wheeled under a motor vehicle so as to collect fluid droppings from the underside thereof.

These, and additional objects, advantages, features and benefits of the present invention will become apparent from the following specification.

BRIEF DESCRIPTION OF THE DRAWINGS

FIG. 4 is a perspective view showing the bed of the cart body according to the present invention now in an extended width configuration, with a bed insert about to be added to the bed.

FIG. 5 is a perspective view of the underside of the cart body according to the present invention, showing the underside of the bed with the bed insert now added thereto.

FIG. 6 is a perspective view of the cart body according to the present invention, showing a tray about to be added to the upper side of the bed.

FIG. 7 is a detail sectional edge view of the tray, seen along lines 7—7 in FIG. 6.

DETAILED DESCRIPTION OF THE PREFERRED EMBODIMENT

Figure 1:
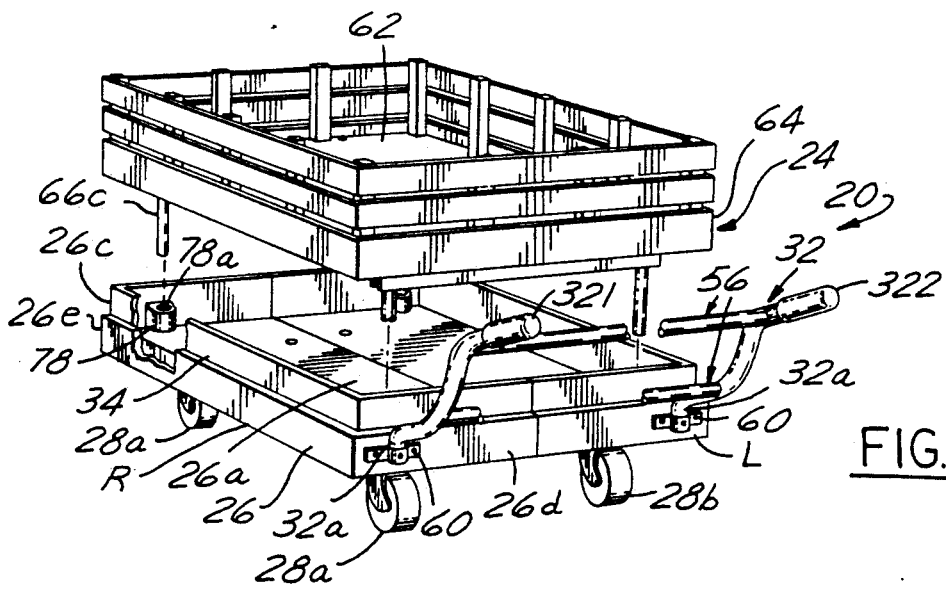
FIG. 1 is a perspective, exploded view of the multi-function cart according to the present invention, showing the upper deck separated from and above the bed of the cart body.
Figure 2:
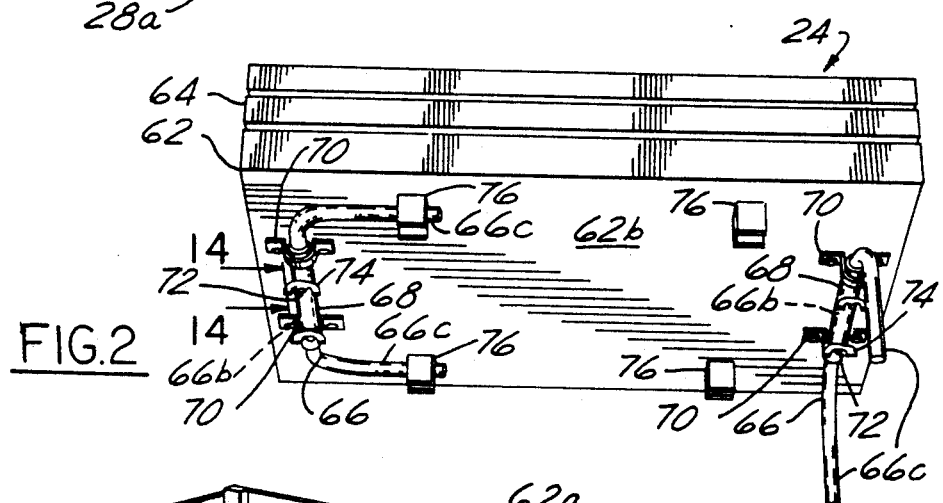
FIG. 2 is a perspective view of the underside of the upper deck, showing in particular the interconnection mechanism between the upper deck and the bed of the cart body.
Figure 3:
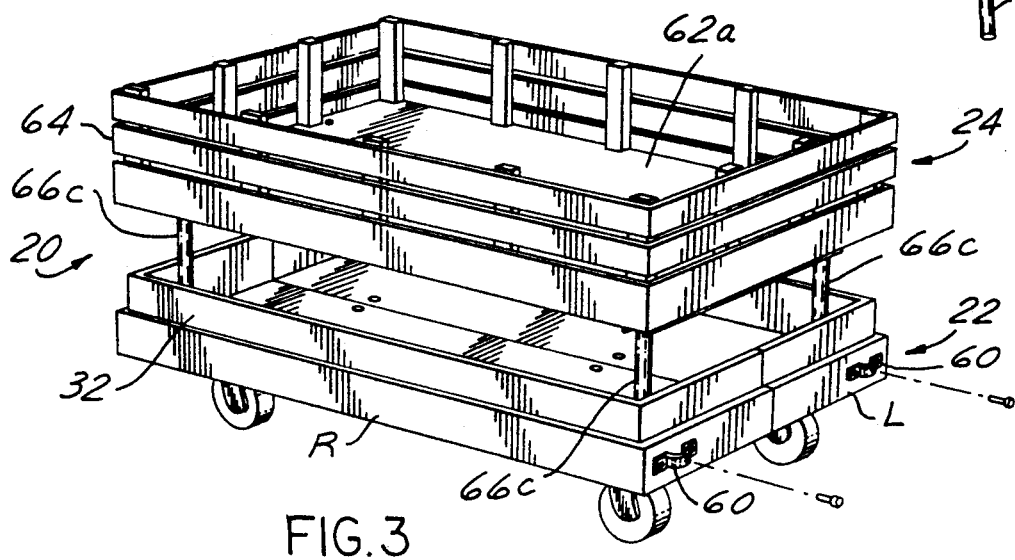
FIG. 3 is a perspective view of the cart according to the present invention, now showing the upper deck connected with the bed of the cart body.

Referring now to the Drawing, FIG. 1 shows basically the multi-function cart 20 according to the present invention. As can be discerned from FIG. 1, the multi-function cart 20 is composed of a cart body 22 and an upper deck 24. The upper deck 24 interconnects releasably with the cart body 22 so as to permit a user to select whether or not to use the upper deck with the cart body, depending upon cargo transport conditions. More specifically, with reference being made to FIGS. 1 through 5 and 13 through 16, the basic features of the multi-function cart 20 in terms of the structure and function of the cart body 22 and the upper deck 24 will be detailed.

With attention first being directed to the cart body 22, FIGS. 1 and 5 depict that the cart body includes a bed 26, a first wheel set 28a located near the right side R of the cart body and connected with the underside 26b of the bed, a second wheel set 28b located near the left side L of the cart body and also connected with the underside 26b of the bed, a bed width adjustment mechanism 30 located at the underside of the bed, extensible handles 32 connected with the bed, and a rail 34 along the periphery 26c of the bed. Articles of whatever sort are placed upon the upper side 26a of the bed 26, and the rail 34 is structured for abutting with the articles located adjacent the periphery 26c of the bed so as to restrain them from falling off the bed. The bed 26 is constructed of a strong and durable material, which may be for instance a high impact plastic. The wheel sets 28a, 28b are preferred to be swivelable and are connected by a common fastening means with the underside 26b of the bed 26. It is further preferred, but not required, for the wheels of the wheels sets 28a, 28b to be constructed of a hard rubber material. The handles 32 are connected with the front end 26d of the bed 26, and are structured to permit a user to grab them and then be able to move the multi-function cart 20 as desired so as to move the articles (if any) situate upon the upper side 26a of the bed. Preferably, the handles 32 are removably connected with the front side 26d of the bed 26, as there may be situations in which the handles would be preferred to be absent, such as for storage purposes.

Figure 16:
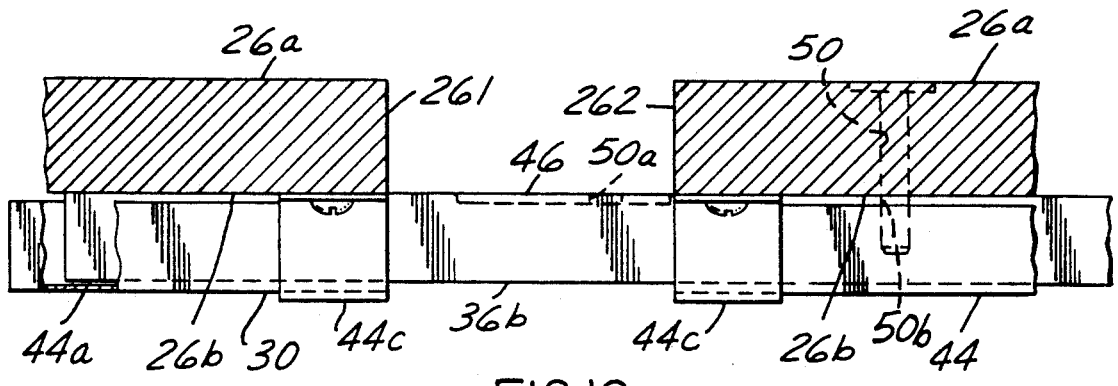
FIG. 16 is a partly sectional front end view of the bed of the cart body according to the present invention, shown along lines 16—16 in FIG. 4.

As indicated hereinabove, the bed 26 includes a bed width adjustment mechanism 30, which is shown with particularity in FIGS. 4, 5, and 16. Width adjustment of the bed 26 is desirable in that the handles already project forwardly from the bed, so that a bed which extends in length from front to rear would be potentially too long to use effectively in a number of situations, such as in a homeowner's garage where many other articles compete with the multi-function cart 20 for floor space. Accordingly, the present invention is structured so that the width of the bed 26 may be changed, rather than the length thereof.

The bed width adjustment mechanism 30 is located at the underside 26b of the bed 26. In this regard, the bed 26 is divided into two bed members 261 and 262 along a line between the front end 26d and rear end 26e, which preferably divides the bed so that the two bed members are of equal size. In order that the two bed members 261 and 262 are extensibly connected so that the width of the bed 26 is variable and yet has structural integrity at all times, a plurality of extensible frame members are connected with the underside 26b of the bed. Preferably, the extensible frame members are composed of two types.

The first type of extensible frame members 36a are structured in the form of elongate members 38 which are connected with one of the bed members 261, 262 and guided slidably with respect to the other bed member by operation of a bracket 40 connected with the other bed member. A stop 42 connected with the free end of the elongate members 38 serves to prevent the bed members 261 and 262 from mutually separating too far.

The second type of extensible frame members 36b are structured in the form of a guide sleeve 44 connected with one of the bed members 261, 262 and a telescoping member 46 connected with the other bed member via a fixed connection to a retaining sleeve 44a, and slidably guided within the guide sleeve. The guide sleeves 44 and retaining sleeves 44a may be connected to the underside 26b of the bed 26 by brackets 44c, or some other fastener device.

When the bed 26 is in a non-extended configuration, as shown in FIG. 1, the extensible frame members 36a, 36b hold the bed members 261 and 262 in a structural interrelationship substantially as if the bed were not divided into bed members. In order to ensure that the bed members 261 and 262 cannot separate via operation of the extensible frame members 36a, 36b, pegs 48 are used. One peg is inserted through each of two holes 50 in the bed, each peg extending into a respective first hole 50a in the telescoping members 46, thereby causing them to be fixed with respect to the bed members 261 and 262 so that separation of the bed members is not possible.

When it is desired to widen the bed 26, the pegs 48 are withdrawn, and the bed members 261, 262 are mutually separated until the stops 42 prevent further separation. Now the pegs 48 are placed back into the holes 50, thereupon passing through second holes 50b in the telescoping members 46, and thereby causing them to be fixed with respect to the bed members 261 and 262 so that the bed members are mutually separated a fixed distance. A bed insert 52 is now placed into the space formed between the two bed members 261, 262. The bed insert 52 is structured to match the structure of the bed 26, including an upper surface 26a' which interfaces with the upper surface 26a of the bed and a rail 34a which interfaces with the rail 34 that is connected with the periphery of the bed. As generally shown in FIG. 5, the extensible frame members 36a, 36b are mutually separated so as to lend support from front to rear of the bed 26 for the bed insert 52, as well as to ensure a high degree of guidance of the two bed members 261, 262 so that they remain always in mutually parallel alignment with relatively very little play or "slop" of movement. The bed insert 52 may simply rest on the extensible frame members or be releasably connected thereto via common fasteners interfacing with holes 54a and 54b.

It is preferred that each extensible frame member of the two types of extensible frame members 36a, 36b be affixed to an alternative one of the two bed members 261, 262, as depicted in the Drawing. It is further preferred that the extensible frame members 36a, 36b be of rectangular cross-section, but this is not a requirement.

Figure 13:
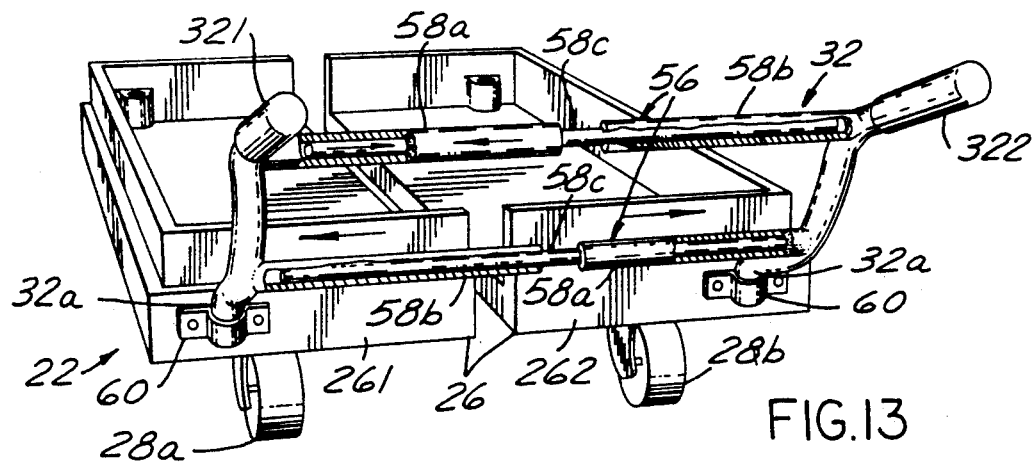
FIG. 13 is a perspective view of the cart body according to the present invention in which the width of the bed is being changed, showing in particular the width adjustment mechanism of the handle.
Figure 14:
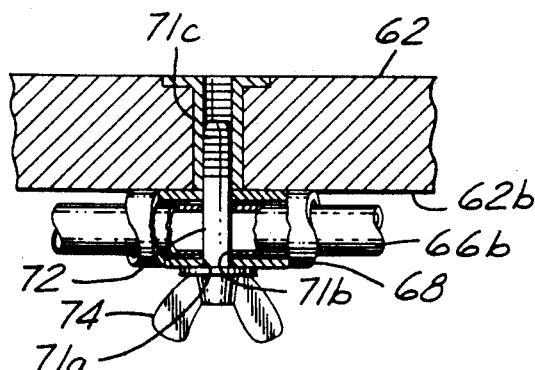
FIG. 14 is a partly sectional edge view of the underside of the upper deck of the cart according to the present invention, showing in particular the connection of one of the leg sets to the aforesaid underside as seen along lines 14—14 in FIG. 2.
Figure 15:
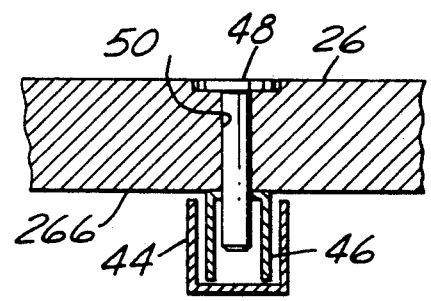
FIG. 15 is a partly sectional front end view of the bed of the cart body according to the present invention, showing in particular a retention mechanism for holding the bed in a selectively adjusted width as seen along lines 15—15 in FIG. 4.

In order that the width of the bed 26 be variable and yet have the handles 32 connect with each of the bed members 261 and 262, the handles are structured to be extensible. In this regard, the handles 32 include reinforcing members 56 which interconnect each handle 321 and 322. As depicted in FIGS. 1 and 13, since the reinforcing members 56 are horizontally oriented, they must be extensible in order to accommodate separation of the bed members 261, 262. As indicated by FIG. 13, each of the reinforcing members 56 is constructed in the form of a pair of handle sleeves 58a and 58b, one of which being connected with one of the handles 321, 322, and the other being connected with the other of the handles. One of the handle sleeves 58a has fixedly connected therewith an extension component 58c that guidably slides into the other handle sleeve 58b. It is preferred for alternate handles 321, 322 to have connected therewith the handle sleeves 58a which are equipped with the extension component 58c. As indicated hereinabove, it is preferred for the handles 32 to be selectively removable with respect to the bed 26. This is accomplished by connecting handle brackets 60 to the front side 26d of the bed 26 into which fit the base portions 32a of the handles 321, 322.

As indicated hereinabove, the multi-function cart 10 includes a double decking feature by the addition of an upper deck 24 to the cart body 22. The structure and function of this feature is depicted in FIGS. 1 through 3 and 14.

The upper deck 24 is composed of an upper deck bed 62 having an upper deck rail 64 along the perimeter thereof. As in the bed 26 of the cart body 22, the upper deck bed 62 is made of a structurally strong and durable material. It is preferred that the upper deck bed 62 be dimensioned to substantially match the area of the bed 26 when the bed is in the unextended configuration, although the upper deck bed could be dimensioned to match the area of the bed when the bed is in the extended configuration.

In order for the upper deck 24 to be selectively connected with the cart body 22, the bottom side 62b of the upper deck bed 62 has connected thereto two U-shaped leg sets 66. The leg sets 66 are pivotally connected with the bottom side 62b of the upper deck bed 62. The pivotal connection is preferred to be accomplished by each U-shaped leg set 66 having a guide portion 66b which is pivotably guided by a leg sleeve 68. The leg sleeve 68 is connected by brackets 70 with the bottom side 62b. The guide portion 66b and the leg sleeve 68 are preferred to be provided with holes 71a, 71b so that a respective bolt 72 can pass therethrough and be threadably engaged with respect to a threaded sleeve 71c which is connected with the upper deck bed 62. A wing head 74 on the bolt 72 permits easy threading of the bolt with respect to the threaded sleeve. Thus, the legs 66c of the leg sets 66 may be held firmly perpendicular with respect to the bottom side 62b. When not in use, each leg set 66 is pivoted so that the legs 66c thereof are parallel with the bottom side 62b and held in that attitude by clips 76 which are connected with the bottom side 62b; alternatively, other holes may be provided in the guide portion 66b so that the bolts 72 may hold the legs of the leg sets in the aforesaid parallel orientation with respect to the bottom side 62b.

Each leg 66c of the leg sets 66 snuggly interconnects with a blind bore 78a in each of four seats 78 provided on the upper side 26a of the bed 26, and are held in place by the weight of the upper deck 24. The upper deck is removed by simply pulling upwardly thereupon so as to unseat the legs from their respective seats.

In operation, articles are placed upon the upper side 26a of the bed 26 and then transported by the user manipulating the multi-function cart 10 via the handles or pushing or pulling on the rail 34. If the load requires, the width of the bed may be increased by removing the pegs 48 separating the two bed members 261 and 262 and then replacing the pegs in new extensible frame member holes. The bed insert 52 is now placed into the space between the bed members and optionally secured by fasteners. In the event it is desired to add an entirely new bed for the carriage of articles, then the upper deck 24 is utilized. The leg sets 66 are pivoted, then locked with the legs in the perpendicular attitude by the bolts 72. Thereupon the legs are inserted into respective seats 78.

As indicated hereinabove, the multi-function cart 10 is also capable of adapting to various environments of use. These functions will be elaborated hereinbelow.

As can be discerned from FIGS. 6 and 7, the multi-function cart 20 serves in the capacity of an oil pan by the placement of a tray 80 that is structured to be placed within and adjacent the rail 34 so as to rest upon the seats 78. The tray 80 includes a peripheral lip 80a and is preferred to be structured to selectively retain a replaceable filter 82 which is composed of a top screen layer 82a, an absorbent middle layer 76d and an impervious bottom layer 82c. In a typical use, the multi-function cart 20 having the tray 80 placed upon the cart body 22 is wheeled under a motor vehicle to collect fluid droppings.

Figure 8:
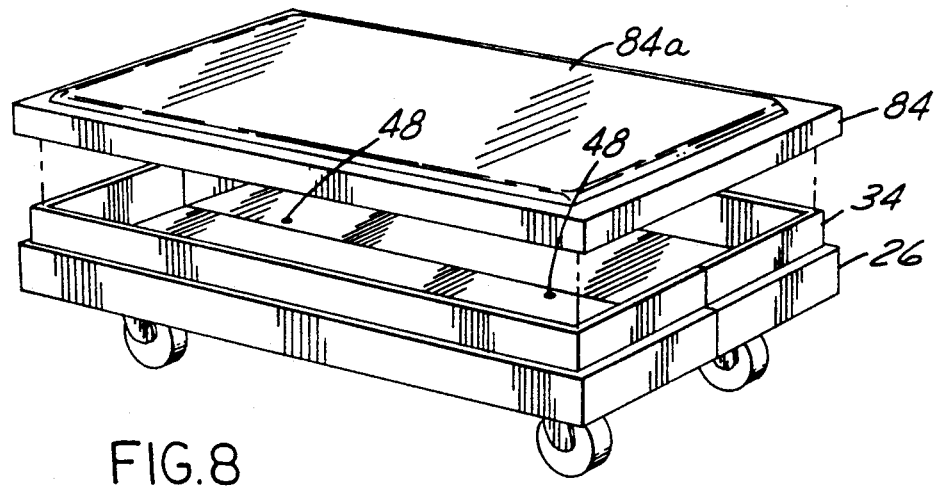
FIG. 8 is a perspective view of the cart body according to the present invention, showing a creeper top about to be added to the upper side of the bed.
Figure 9:
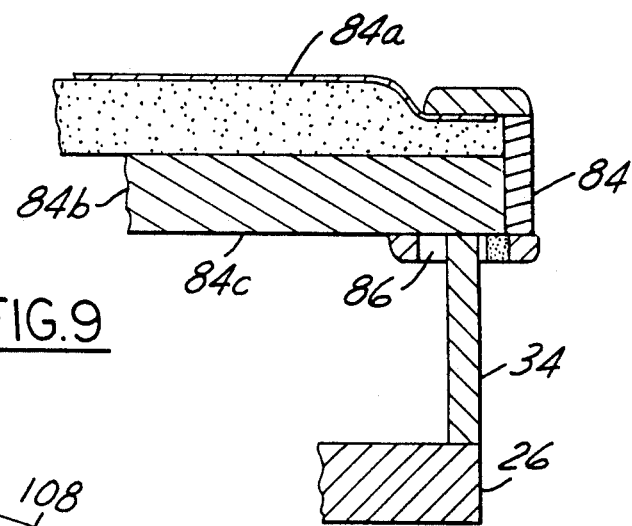
FIG. 9 is a detail sectional edge view of the creeper top, seen in operation with respect to the cart body.

As can be discerned from FIGS. 8 and 9, the multi-function cart 20 serves in the capacity of a mechanic's creeper by the placement of a creeper top 84 upon the rail 34 of the cart body 22. The creeper top 84 is preferred to be structured to include a padded top 84a that fits over a flat rigid base 84b. It is preferred for the bottom 84c of the base 84b to be provided with a peripheral indentation 86 that provides an abutable interlock with respect to the rail 34. In a typical use, a mechanic lays on the creeper top 84 situate upon the cart body 22 and then wheels under a motor vehicle to work on its underside. With respect to each of the tray 80 and creeper top 84 uses of the multi-function cart 20, it is preferred for the wheels of the wheel sets 28a, 28b to be of small diameter, although for articles transportation uses of the multi-function cart, a small diameter of the wheels is not a requirement.

Figure 10:
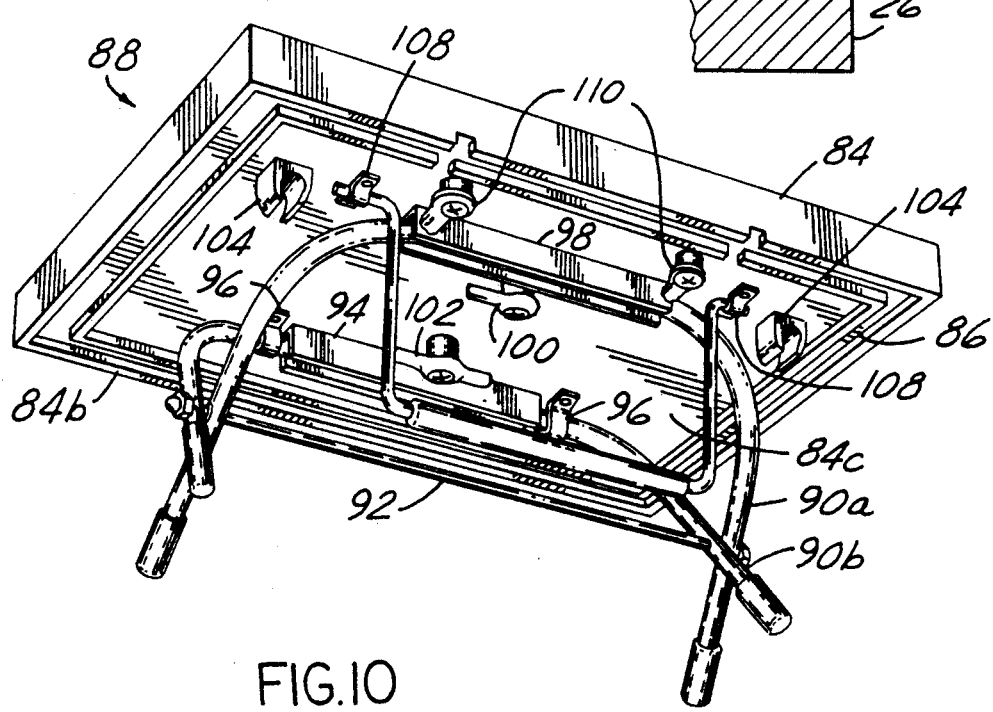
FIG. 10 is a perspective view of the bottom of the creeper top, showing the components which convert the creeper top into a portable seat in a deployed orientation.
Figure 11:
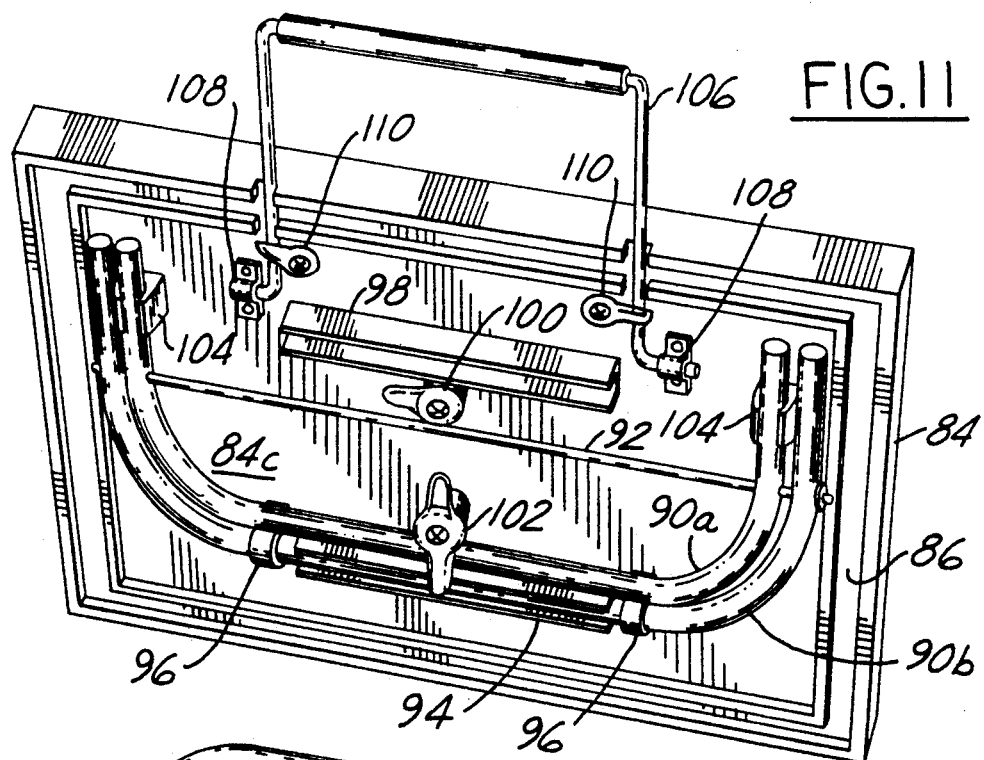
FIG. 11 is a perspective view of the bottom of the creeper top, showing the leg sets of the seat in a collapsed orientation, and a handle in the deployed orientation.
Figure 12:
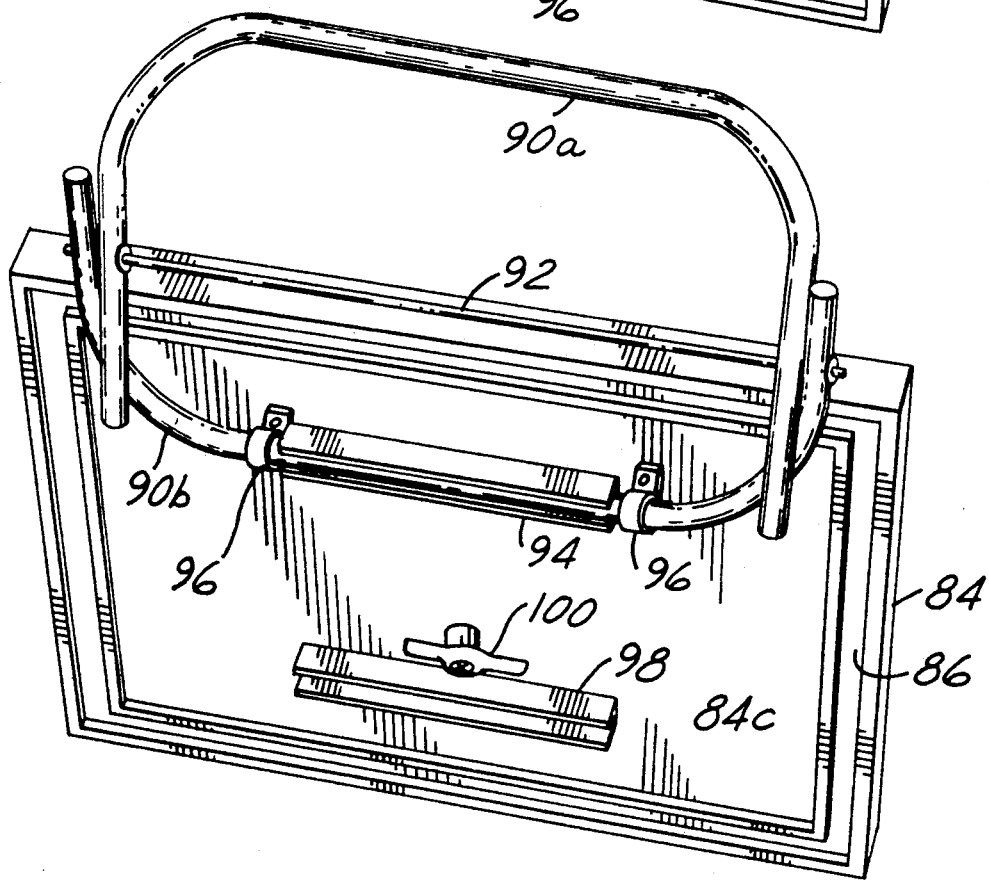
FIG. 12 is a perspective view of the bottom of the creeper top, alternatively showing one of the leg sets of the seat being used as a handle.

Further with respect to the creeper top 84, as indicated by FIGS. 10 through 12, it is preferred for seat legs to be foldably connected thereto for purposes of converting the creeper top into a stand-alone, portable seat (or bench) 88. Such a seat is useful for many purposes, including a resting seat for one user, or a bench for two or more users, in conjunction with labors connected with use of the multi-function cart 20. The bottom 84c of the base 84b is provided with a pair of U-shaped legs 90a, 90b which are mutually pivotally connected via a pivot rod 92. One of the U-shaped legs 90b is pivotally connected with the bottom 84c of the creeper top 84, preferably via a channel clip 94 and brackets 96. The other of the U-shaped legs 90a is releasably held in another channel clip 98 via a latch 100. A second latch 102 is used to hold the other U-shaped leg in a collapsed configuration along with clips 104, as shown in FIG. 11. A handle 106 is pivotally connected by brackets 108 with the bottom 84c and is optionally provided for carrying purposes. The handle is held in the deployed orientation by clips 110, as shown in FIG. 11; however, as shown in FIG. 12, the handle may be obviated in the event one of the U-shaped legs 90a is used as a carrying handle.

Operation of the U-shaped legs 90a, 90b will now be detailed. Starting with the collapsed configuration depicted in FIG. 11 which is the orientation used for transport of the seat 88 and for use of the creeper top 84 with respect to the cart body 22, the releasably held U-shaped leg 90a is released from the latch 102, then pivoted so as to be inserted into the channel clip 98 and thereupon retained by the latch 100 so as to achieve the deployed leg orientation that is depicted in FIG. 10. Collapse of the U-shaped legs is accomplished by reversing the steps just recounted.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A cart comprising:
   a cart body, comprising:
      a substantially planar bed having a front end, a rear end, a left end, a right end, an upper side and an underside, said front, rear, left and right ends defining a perimeter of said bed;
      a rail connected with said bed, said rail running along said perimeter at said upper side of said bed;
      wheel means located on said underside of said bed and connected with said bed for providing wheeled movement of said bed;
      handle means connected with said front end of said bed for providing a hand hold for a user to move the cart;
      a plurality of seat means connected with said upper side of said bed; and
   an upper deck structured for being removably connected with said cart body, said upper deck comprising:
      a substantially planar upper deck bed having a front end, a rear end, a left end, a right end, an upper side and an underside, said front, rear, left and right ends of said upper deck bed defining a perimeter of said upper deck bed;
      an upper deck rail connected with said upper deck bed and running along said perimeter of said upper deck bed at said upper side of said upper deck bed;
      a first leg set pivotally connected with said underside of said upper deck bed substantially adjacent said front end thereof, said first leg set comprising a first leg substantially adjacent said right side of said upper deck bed and a second leg substantially adjacent said left side of said upper deck bed;
      a second leg set pivotally connected with said underside of said upper deck bed substantially adjacent said rear end thereof, said second leg set comprising a third leg substantially adjacent said right side of said upper deck bed and a fourth leg substantially adjacent said left side of said upper deck bed; and
      means connected respectively with said first leg set and said second leg set for selectively retaining said first and second legs and said third and fourth legs in selectively a first position and selectively in a second position, said first, second, third and fourth legs being adjacent said underside of said upper deck bed when in said first position, said first, second, third and fourth legs being perpendicular to said underside of said upper deck bed when in said second position;
      wherein said first, second, third and fourth legs have lower end portions which are adapted to be inserted seatably into respective ones of said plurality of seat means to thereby connect said upper deck bed to said cart body a predetermined length from said bed of said cart body.

2. The cart of claim 1, further comprising creeper top means structured for being connected with said rail of said cart body for converting said cart into a creeper.

3. The cart of claim 2, further comprising seat leg means foldably connected with said creeper top means for converting said creeper top means into a seat.

4. The cart of claim 1, further comprising tray means structured for being connected with said cart body adjacent said rail thereof for providing a wheeled drip pan.

* * * * *